United States Patent [19]

Iwashita et al.

[11] Patent Number: 4,737,018

[45] Date of Patent: Apr. 12, 1988

[54] DISPLAY DEVICE HAVING ANTI-REFLECTIVE ELECTRODES AND/OR INSULATING FILM

[75] Inventors: Yukihiro Iwashita; Koji Sumi; Koichi Kamijo; Hideaki Okamura, all of Nagano, Japan

[73] Assignee: Seiko Epson Corporation, Tokyo, Japan

[21] Appl. No.: 824,028

[22] Filed: Jan. 30, 1986

[30] Foreign Application Priority Data

Jan. 30, 1985 [JP] Japan ................................ 60-15848
Jan. 30, 1985 [JP] Japan ................................ 60-15849
Jul. 12, 1985 [JP] Japan ................................ 60-15369

[51] Int. Cl.$^4$ .................................................. G02F 1/13
[52] U.S. Cl. .................................. 350/339 R; 350/336; 350/357
[58] Field of Search .................. 350/336, 338, 339 R, 350/357

[56] References Cited

U.S. PATENT DOCUMENTS

| | | | |
|---|---|---|---|
| 4,248,502 | 2/1981 | Bechteler et al. | 350/339 R X |
| 4,309,083 | 1/1982 | Duchene et al. | 350/357 |
| 4,505,547 | 3/1985 | Sekimura | 350/336 X |

Primary Examiner—Stanley D. Miller
Assistant Examiner—Richard F. Gallivan
Attorney, Agent, or Firm—Blum Kaplan

[57] ABSTRACT

A display device including a pair of opposed substrates at least one of which is transparent with a display medium layer therebetween, and a transparent electrode arranged on the internal surface of the transparent substrate is provided. The thickness of the transparent electrode is about $(5500/(2 \times n))$Å wherein n represents the refractive index thereof. When a transparent insulating film is formed on the transparent electrode, the thickness of the transparent insulating film is about $(5500/(2 \times m))$Å wherein m represents the refractive index thereof. When the refractive index of $n_1$ of the transparent insulating film is substantially equal to the refractive index $n_2$ of the transparent electrode, the value, $2 \times (n_1 \times d_1 + n_2 \times d_2)$ equals about 5500Å wherein $d_1$ represents the thickness of the transparent insulating film and $d_2$ the thickness of the transparent electrode.

33 Claims, 2 Drawing Sheets

DISPLAY DEVICE HAVING ANTI-REFLECTIVE ELECTRODES AND/OR INSULATING FILM

BACKGROUND OF THE INVENTION

This invention relates to display devices including an electro-optical or electrolytic display medium and, more particularly, to display devices in which the thickness of transparent electrodes and/or transparent insulating films formed on a transparent substrate is optimized.

Recently, display devices wherein a display medium is enclosed between substrates have been used in office automation equipment. These display devices include liquid crystal display devices and electrochromic display devices. In such devices at least one substrate is transparent and has a transparent electrode disposed thereon in order to permit observation of the display medium through the transparent electrode. When the display capacity is increased in these devices, the degree of drive multiplexing is increased and the contrast ratio decreases. The decrease in contrast ratio occurs as a result of reflection between the transparent substrate and the transparent electrode provided on the substrate or between the transparent electrode and the liquid crystal display medium in the case of a liquid crystal display device. When reflections occur, light other than that necessary for display is observed and observation of the display becomes difficult.

Furthermore, when an insulating film is provided on the electrode for protecting the electrode, for preventing application of DC voltage to the liquid crystal layer, and for improving the performance of the display device through control of the orientation of the liquid crystal molecules, additional reflected light is generated. For example, a display device of the twisted nematic type was produced using glass substrates. An indium oxide-tin oxide (ITO) film having a thickness of 800 Å was used as the transparent electrode and a silicon dioxide ($SiO_2$) insulating film having a thickness of 1000 Å was formed on the electrode. A liquid crystal display cell was formed by enclosing a liquid crystal material between two electrodes. A polarizing plate was attached to one side of the display and a second polarizing plate and irregular reflecting plate was attached to the opposite side of the display. The linear reflectivity of the display device was about 8%, of which about 4% resulted from reflection from the internal surfaces of the liquid crystal display cell. Since the total reflectivity of the device was about 23%, it is clear that the amount of reflected light that was unnecessary for display was equal to about one-third (⅓) of the total reflectivity; only about two-thirds (⅔) of the total amount of reflected light was necessary for display. The reflected light from the surface boundary of the transparent electrode deteriorated the quality of display of the device. These disadvantages impose a serious constraint of the use and popularity of these devices.

It is, therefore, desirable to provide a display device that overcomes the disadvantages inherent in prior art display devices.

SUMMARY OF THE INVENTION

Generally speaking, in accordance with the invention a display device having at least one transparent electrode of an optimum thickness is provided. The thickness, d, of the transparent electrode is about $(5500/(2\times n))$ Å, wherein n is the refractive index of the transparent electrode material. When an insulating film is provided on the transparent electrode, the thickness of the transparent insulating film is about $(5500/(2\times m))$ Å wherein m is the refractive index of the transparent insulating film material. The refractive index, m, of the transparent insulating film material is selected so as to be substantially identical to the refractive index, n, of the transparent electrode material. The value of $2\times(m\times d_1+n\times d_2)$ is about 5500 Å wherein $d_1$ is the thickness of the transparent insulating film and $d_2$ is the thickness of the transparent electrode. The display medium may be an electro-optical medium or an electrochromic medium such as a liquid crystal material.

Accordingly, it is an object of the invention to provide an improved display device.

It is another object of the invention to provide a display device wherein reflected light from the surface boundary of a transparent electrode is reduced resulting in a display of improved quality.

It is a further object of the present invention to reduce the amount of linear reflected light from the internal surface of a liquid crystal cell even when an insulating film is provided on a transparent electrode in order to improve the performance of such a display device by improving the quality of the display.

Still other objects and advantages of the invention will in part be obvious and will in part be apparent from the specification.

The invention accordingly comprises an article of manufacture possessing the features, properties, and relation of elements which will be exemplified in the article hereinafter described, and the scope of the invention will be indicated in the claims.

DESCRIPTION OF THE DRAWINGS

For a fuller understanding of the invention, reference is had to the following description taken in conjunction with the accompanying drawings, in which.

DESCRIPTION OF THE PREFERRED EMBODIMENTS

The optimization in thickness of the transparent electrodes and/or transparent insulating films thereon in accordance with the invention is useful in all types of electro-optical display devices, such as electrochromic display devices, electrophoretic display devices and the like. The invention will be described with reference to liquid crystal display devices for purposes of simplification and explanation of the application of the invention. It should be clear, however, that the invention is not intended to be limited in any respect to use in liquid crystal display devices.

Figure 1:
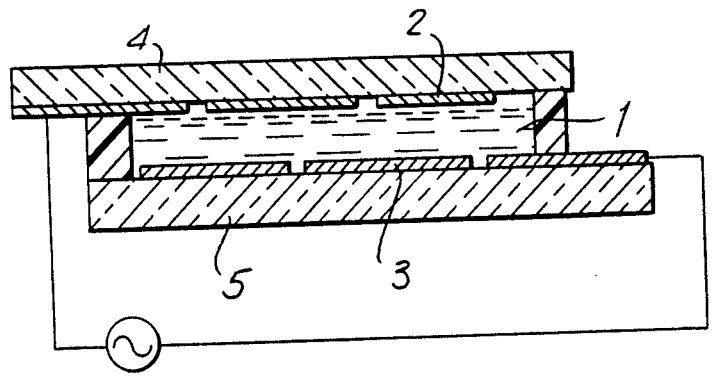
FIG. 1 is a cross-sectional view of a liquid crystal display device constructed and arranged in accordance with the invention.

A cross-sectional view of a liquid crystal display panel of a dot matrix display device having a duty ratio of 1/100 to 1/200 in which the present invention can be applied is shown in FIG. 1. A liquid crystal material layer 1 is maintained between two substrates 4 and 5, each having a transparent electrode 2 and 3, respectively, on its internal surface. At least one of the substrates 4 or 5 is transparent.

Referring to FIG. 1, in a conventional display device indium oxide or tin oxide transparent electrode 2 has a refractive index in the range of from about 1.8 to 2.2. Liquid crystal layer 1 and transparent substrate 4 have refractive indices in the range of from about 1.45 to 1.7. Practical and useful transparent electrode material for liquid crystal display devices include indium oxide, tin oxide, an ITO film of indium oxide and tin oxide, an ITO film of tin oxide and antimony oxide, titanium oxide, gold and the like. The refractive index of the ITO films is about 1.8 and the refractive index of tin oxide is about 2.1. These values are large in comparison with the refractive indices of glass substrates made of soda glass, borosilicate glass and the like and of plastic substrates made of polysulfone, polyether sulfone, polyethyleneterephthalate and the like, which are between about 1.45 and 1.6. Additionally, the refractive index of the liquid crystal material used in the liquid crystal display device is generally between about 1.45 and 1.6 in the short axis direction and between about 1.5 and 1.7 in the long axis direction.

Because of the difference in refractive indices of electrode 2 and substrate 4 in conventional liquid crystal display devices, reflection takes place at surface boundaries between transparent substrate 4 and transparent electrode 2 and also between transparent electrode 2 and liquid crystal layer 1. This causes reflected light to enter the eye together with the light necessary for viewing the display. Additionally, when an insulating film 6 is provided on substrate 4 and transparent electrode 2 for protecting electrode 2, preventing application of DC voltage to liquid crystal layer 1 and improving performance of the display device through control of the orientation of liquid crystal molecules, additional reflected light is generated.

When a display device includes a transparent electrode prepared in accordance with the invention, light reflected from the surface boundary between the substrate and the transparent electrode and light reflected from the surface boundary between the transparent electrode and the liquid crystal layer differs by about one-half in phase. Accordingly, the total amount of reflected light decreases. It can, therefore, be seen that display elements prepared in accordance with the invention prevent deterioration of display quality due to reflected light and liquid crystal display devices of high visual recognizability can be provided.

For a better understanding of the invention, reference is made to the following examples. These examples are presented for purposes of illustration only and are not intended to be construed in a limiting sense.

EXAMPLE 1

A twisted nematic type liquid crystal display device was prepared. An ITO film having a refractive index of 1.8 was used as the transparent electrode and soda lime glass coated with $SiO_2$ was used as the substrate. The thickness of the transparent electrode was 1450 Å, which is close to the optimum calculated thickness of 1527 Å obtained using the formula $d=(5500/(2\times 1.8))$ Å wherein d is the optimum thickness of a transparent electrode having a refractive index of 1.8. Polyvinyl alcohol was coated on the patterned transparent electrode and the exposed glass substrate to a thickness of less than 100 Å so as not to cause any appreciable optical influence. The surface was treated by rubbing and then a liquid crystal display device was prepared using a liquid crystal material having a refractive index of 1.53 in the short axis direction and a birefringent index of 0.21 between two substrates that were prepared as described. The thickness of the liquid crystal material layer was $8.5\mu\pm 0.5\mu$.

The liquid crystal display cell was placed between two polarizing plates having axes aligned so that polarized light entered the cell in the short axis direction of the liquid crystal material. Bonding layers were provided between the substrates and the polarizing plates and an irregular reflecting plate was bonded on one side. The linear reflectivity of the liquid crystal display device was 4.2%, which is less than the linear reflectivity of conventional devices, which is about 6%. Because the surface reflection from the polarizing plate or uppermost surface is about 4%, it is clear that little of the reflection arises from the transparent electrode.

EXAMPLE 2

A liquid crystal display device was produced as described in Example 1 and the surface of the upper polarizing plate was coated with magnesium difluoride ($MgF_2$) having a thickness of 1000 Å. The linear reflectivity of this device was 2%. Thus, a liquid crystal display device having only a small amount of linear reflected light and good visual recognizability was obtained.

EXAMPLE 3

Using tin oxide doped with antimony oxide for a transparent electrode, a positive-type quest-host-mode liquid crystal display device was fabricated. The thickness of the transparent electrode was 1200 Å, which is close to the optimal calculated thickness of 1250 Å obtained using the formula $d=(5500/(2\times 2.2))$ Å wherein d is the optimum thickness of the electrode. The refractive index of the transparent electrode material is 2.2. The liquid crystal material contained 4% dyestuffs and 0.5% optical activator and had a refractive index in the short axis direction of 1.52. The liquid crystal material was placed between two substrates treated by a vertical orienting agent of some 10 Å and a white irregular reflecting plate was attached to one side using a bonding layer. The linear reflection of the liquid crystal display device was 4.5%, which is a significant improvement over the linear reflection of a conventional device which is about 8%.

It can be seen by examining the configuration produced by forming a transparent electrode on a transparent substrate, such as glass, having a refractive index less than that of the transparent electrode and forming an insulating film on the transparent electrode, the linear reflection can be significantly reduced when the elements are assembled as described. It is possible to reduce the total reflected light by designing the device so that reflected rays from respective surface boundaries interfere with each other in such a was as to be mutually offsetting. Accordingly, it is possible to prevent deterioration of the quality of display arising from reflected light caused by the display element and display devices of good visual recognizability can be obtained.

EXAMPLE 4

A twisted nematic type liquid crystal display device was prepared as follows. Soda lime glass having a refractive index of 1.52 was used as the substrate. Transparent electrodes were formed from an ITO film having a thickness of 1500 Å, which is close to the 1527 Å calculated as the optimum thickness on the basis of $d=(5500/(2\times 1.8))$ Å wherein d is the optimum thickness and the refractive index of the ITO film is 1.8. The ITO film was deposited on the glass by spattering and a $SiO_2$ insulating film having a thickness of 1900 Å was formed on the ITO film. The optimum thickness of the insulating film was calculated to be 1896 Å on the basis of $d=(5500/(2\times 1.45))$ Å wherein d is the optimum thickness and the refractive index of the $SiO_2$ film is 1.45. The $SiO_2$ film was also formed by spattering.

A polyvinyl alcohol film was coated on the $SiO_2$ to a thickness of 50 Å in order to promote orientation of the liquid crystals and so as not to cause an appreciable optical influence. The surface was treated by rubbing and a liquid crystal material layer having a refractive index of 1.53 in the short axis direction and a birefringent index of 0.21 was placed between the two substrates that were prepared as described. The thickness of the liquid crystal material layer was $8.5\mu\pm 0.5\mu$. The liquid crystal display cell produced was placed between two polarizing plates having axes aligned so that polarized light entered the cell in the short axis direction of the liquid crystal material. Bonding layers were provided between the polarizing plates and the liquid crystal display cell and an irregular reflecting plate was bonded on one side. The linear reflectivity of the liquid crystal display device was measured at 4%, which is significantly lower than the linear reflectivity of conventional devices.

Figure 2:
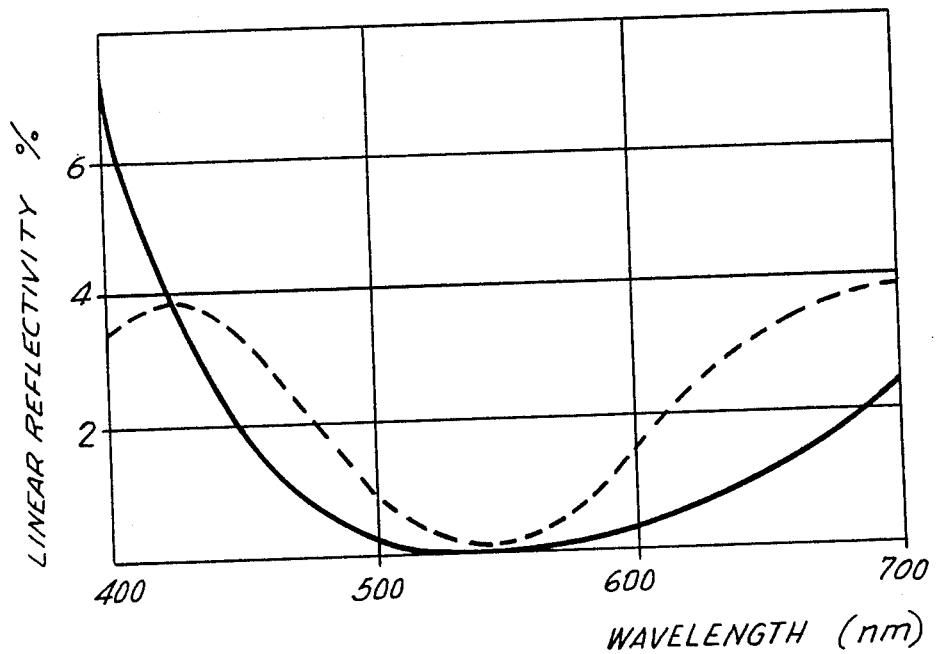
FIG. 2 is a graph showing the spectral characteristics of linear reflectivity of the liquid crystal display device of FIG. 1.
Figure 3:
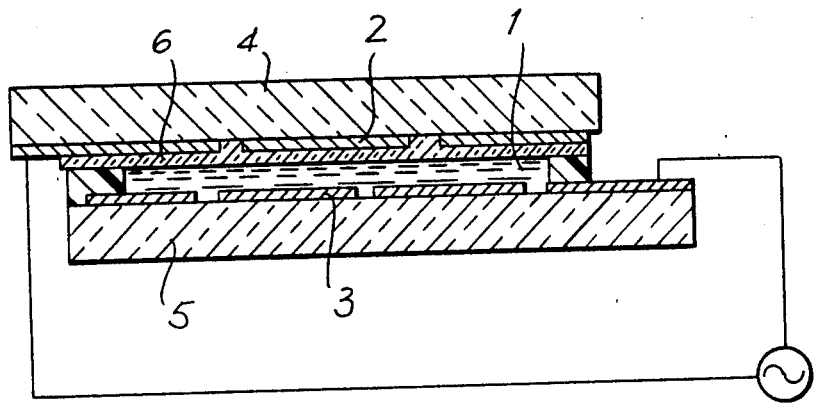
FIG. 3 is a cross-sectional view of a liquid crystal display device constructed and arranged in accordance with another embodiment of the invention.

The linear reflection of 4% was measured from the surface of the uppermost polarizing plate and the linear reflection from the internal surface of the liquid crystal display cell was substantially negligible. To eliminate absorption of reflected light from the internal surface of the liquid crystal display cell as a result of the polarizing plate, the polarizing plate was removed from the display device and linear reflectivity due to the internal surface of the liquid crystal display cell was measured using polarized light. The measured value is shown by the solid line in FIG. 2. After compensation for visual sensitivity, reflectivity caused by both sides of the liquid crystal layer on the liquid crystal cell internal surface was 0.25%. Thus, it can be seen that in a display device having a polarizing plate on an upper surface, reflected light from the internal surface of the liquid crystal display cell was practically negligible. By using the configuration described, the reflected light was reduced remarkably as compared to the amount of reflected light arising in conventional liquid crystal display devices. Visual recognizability was also improved.

EXAMPLE 5

A display device having the configuration described in Example 4 was prepared except that the insulating film was formed using a polyimide resin having a refractive index of 1.7 and a thickness of 1500 Å. The optimum calculated thickness of the polyimide resin was 1618 Å based on the formula $d=(5500/(2\times 1.7))$ Å wherein d is the optimum thickness and the refractive index of the resin was 1.7. As in Example 4, the reflected light from the internal surface of the liquid crystal cell was measured using linear polarized light having an oscillation in the short axis direction of the liquid crystal material. The measured value is shown by the broken line in FIG. 2. After compensation for visual sensitivity, the reflectivity was found to be 0.8%. By addition of the polarizing plate, the reflected light was correspondingly reduced to 0.3% and reflection from the internal surface of the liquid crystal display cell became negligibly small, a result similar to that seen in the display cell of Example 4.

EXAMPLE 6

A device of the type produced in Example 4 was prepared. Glass, having one surface coated with $SiO_2$, zirconium dioxide and magnesium difluoride so that the surface reflection was 0.3% was attached using a bonding layer. The linear reflectivity of the device was 0.7%, inclusive of measurement errors, and the linear reflection from the surface of the display device and the inside of the liquid crystal cell was reduced to an imperceptible level. A light-passive type display device having a clear picture was obtained.

EXAMPLE 7

A twisted nematic type liquid crystal display device was prepared. Soda lime glass having a refractive index of 1.52 was used as the substrate. The transparent electrode was an ITO film having a thickness of 1000 Å was formed by spattering. The ITO film was selected in view of a low resistance of $30\Omega/\square$ so that it could be applied to a large-sized liquid crystal display device. A polyimide transparent insulating film having a refractive index of 1.7 was formed on the electrode. The refractive index of the polyimide transparent insulating film is close to the refractive index of 1.8 of the transparent electrode. The polyimide transparent insulating film having a thickness of 600 Å, which is close to the optimum calculated thickness of 559 Å based on the equation $2\times(1.7\times d_1+1.8\times 1000)=5500$ wherein the refractive index of the transparent insulating film is 1.7, $d_1$ is the optimum thickness of the transparent insulating film in Å, the refractive index of the transparent electrode is 1.8 and 1000 is the thickness of the transparent electrode in Å.

Since the polyimide film can also be used as an orientation film for the liquid crystal material, a liquid crystal material layer having a refractive index of 1.53 in the short axis direction and a birefringent index of 0.21 was placed between the two substrates whose surfaces had been treated by rubbing. The thickness of the liquid crystal layer was $8.5\mu\pm 0.5\mu$.

This liquid crystal display cell was placed between two polarizing plates having axes aligned so that polarized light entered the liquid crystal in the short axis direction and bonding layers were provided between the polarizing plates and the substrates and an irregular reflecting plate was bonded on one side. The linear reflectivity of the liquid crystal display device was measured at 5%, which is a significant improvement over the linear reflectivity of conventional devices. The linear reflection of 5% arose primarily from the surface of the uppermost polarizing plate and it was believed that the reflection from the internal surface of the liquid crystal display cell was nearly negligible.

Figure 4:
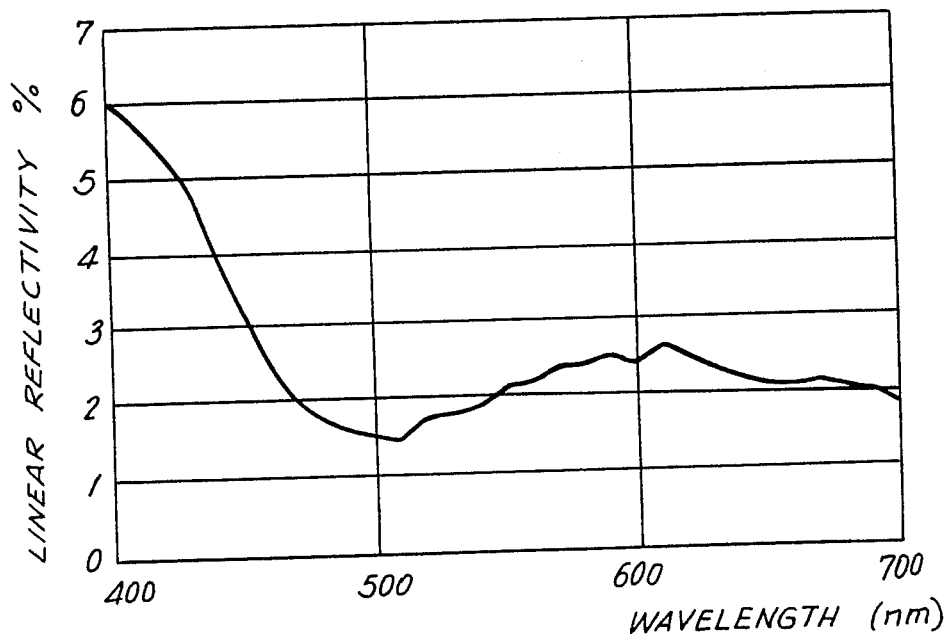
FIG. 4 is a graph showing the spectral characteristics of linear reflectivity of the liquid crystal display device of FIG. 3.

To determine if this was the case, a glass having one low reflective surface, that is, a surface having a reflectivity of 0.3%, was attached to the uppermost face of the liquid crystal display device using a bonding agent having a refractive index of 1.51. The linear reflectivity of the resultant device measured 1.5%. Visual observation in the surface of the display device showed nothing because the amount of linear reflected light was minimal. FIG. 4 showns the linear reflection from the surface of the liquid crystal display cell measured using polarized light as in Example 4. Accordingly, the linear reflection from the internal surface of the liquid crystal cell was remarkably reduced by providing the electrodes in the configuration in accordance with the invention.

EXAMPLE 8

A liquid crystal display device of the type described in Example 7 was prepared. In order to improve the characteristics of the insulating film, the thickness of the insulating film was decreased to 800 Å and the thickness of the ITO film was 750 Å in accordance with the formula for determining the optimum thickness. The display device produced in this manner had an effect similar to the effect shown by the display device of Example 1.

EXAMPLE 9

A display device of the type described in Example 7 was prepared except that the insulating film was prepared by uniformly mixing 50% by weight of $SiO_2$ and 50% by weight of tantalum pentaoxide ($Ta_2O_5$). A transparent electrode was deposited on the substrate and an insulating thin film was formed thereon by an organic thermodecomposition process. An ITO film was used as the transparent electrode, the gap between the patterned segments of ITO was 40μ and the width of the electrode was 300μ. The thickness of the ITO film was 800 Å and the thickness of the insulating film having a refractive index of 1.7 was also 800 Å. Accordingly, the optimization formula becomes $2\times(1.7\times800+1.7\times800)$, which equals 5440, which is substantially close to the optimum value of 5500. The linear reflection characterics were substantially the same as those of Example 1.

Although the examples shown utilize twisted nematic type liquid crystal display devices, it has been confirmed that the same effect can be achieved when the invention is applied to guest-host type and phase-change type smectic liquid crystal display devices. In addition, the invention can be applied to display devices having a similar configuration with a display medium enclosed between a pair of electrode substrates, such as ECD, electro-phoretic, or magneto-phoretic display devices.

It will thus be seen that the objects set forth above among those made apparent from the preceding description, are efficiently attained and, since certain changes may be made in the above article without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:
1. A display device comprising:
a pair of opposed spaced apart substrates at least one of which is transparent;
an electrode disposed on the interior surface of each of the substrates, the electrode on the transparent substrate being itself transparent;
a display material enclosed between the substrates; and
wherein the transparent electrode is about $(5500/(2\times n))$ Å thick, wherein n is the refractive index of the transparent electrode.

2. The display device of claim 1, wherein the display material is an electro-optical material.

3. The display device of claim 1, wherein the display material is an electro-chromic material.

4. The display device of claim 1, wherein the display material is a liquid crystal material.

5. The display device of claim 4, wherein the liquid crystal material has a refractive index of 1.53 in the short axis direction and a birefringent index of 0.21.

6. The display device of claim 1, further including a transparent insulating film formed on the transparent electrode.

7. The display device of claim 1, wherein the transparent substrate is soda lime glass coated with silicon dioxide.

8. The display device of claim 7, wherein the transparent electrode is an indium oxide and tin oxide film having a refractive index, n, of 1.8.

9. The display device of claim 8, wherein the indium oxide and tin oxide film is deposited by sputtering.

10. The display device of claim 7, wherein the transparent electrode is tin oxide doped with antimony oxide and the refractive index of the transparent electrode is 2.2.

11. The display device of claim 1, wherein the transparent substrate is soda lime glass having a refractive index, n, of 1.52.

12. The display device of claim 11, wherein the transparent electrode is an indium oxide and tin oxide film having a refractive index, n, of 1.8.

13. The display device of claim 12, further including a transparent insulating film disposed on the transparent electrode.

14. The display device of claim 13, wherein the transparent insulating film is silicon dioxide having a refractive index of 1.45.

15. The display device of claim 14, wherein both the indium oxide and tin oxide film and the silicon dioxide transparent insulating film are formed by sputtering.

16. The display device of claim 13, wherein the transparent insulating film is a polyimide resin having a refractive index of 1.7.

17. The display device of claim 13, wherein the transparent insulating film is 50% by weight of silicon dioxide and 50% by weight of tantalum pentaoxide and the transparent insulating film has a refractive index of 1.7.

18. A display device comprising:
a pair of opposed substrates having electrodes formed on the interior surfaces thereof, at least one of the substrates being transparent;
a display medium layer between the substrates;
a transparent electrode formed on the internal surface of the transparent substrate;
a transparent insulating film formed on the transparent electrode selected so that the refractive index $n_1$ of the transparent insulating film is substantially identical to the refractive index $n_2$ of the transparent electrode and the value of $2\times(n_1\times d_1+n_2\times d_2)$ is about 5500 Å, wherein $d_1$ represents the thickness of the transparent insulating film and $d_2$ represents the thickness of the transparent electrode.

19. The display device of claim 18, wherein the display medium layer is formed of an electro-optical material.

20. The display device of claim 18, wherein the display medium layer is formed of an electro-chromic material.

21. The display device of claim 18, wherein the display medium layer is formed of a liquid crystal material.

22. The display device of claim 21, wherein the liquid crystal material has a refractive index of 1.53 in the short axis direction and a birefringent index of 0.21.

23. The display device of claim 18, wherein the transparent substrate is soda lime glass coated with silicon dioxide.

24. The display device of claim 23, wherein the transparent electrode is an indium oxide and the tin oxide film having a refractive index, n, of 1.8.

25. The display device of claim 24, wherein the indium oxide and tin oxide film is deposited by sputtering.

26. The display device of claim 24, wherein the transparent insulating film is silicon dioxide having a refractive index of 1.45.

27. The display device of claim 26, wherein both the indium oxide and tin oxide electrode film and the silicon dioxide transparent insulating film are formed by sputtering.

28. The display device of claim 23, wherein the transparent electrode is tin oxide doped with antimony oxide and the refractive index of the transparent electrode is 2.2.

29. The display device of claim 18, wherein the transparent substrate is soda lime glass having a refractive index, n, of 1.52.

30. The display device of claim 29, wherein the transparent electrode is an indium oxide film having a refractive index, n, of 1.8.

31. The display device of claim 18, wherein the transparent insulating film is a polyimide resin having a refractive index of 1.7.

32. The display device of claim 18, wherein the transparent insulating film is 50% by weight of silicon dioxide and 50% by weight of tantalum pentaoxide and has a refractive index of 1.7.

33. A transparent substrate assembly for use in a display device having two substrates at least one of which is transparent positioned in a parallel spaced relationship and a display material therebetween, comprising:
   a transparent substrate; and
   a transparent electrode disposed on the surface of the substrate,
   wherein the transparent electrode has a thickness of $(5500/2 \times n))$ Å, wherein n is the refractive index of the transparent electrode.

* * * * *